UNITED STATES PATENT OFFICE.

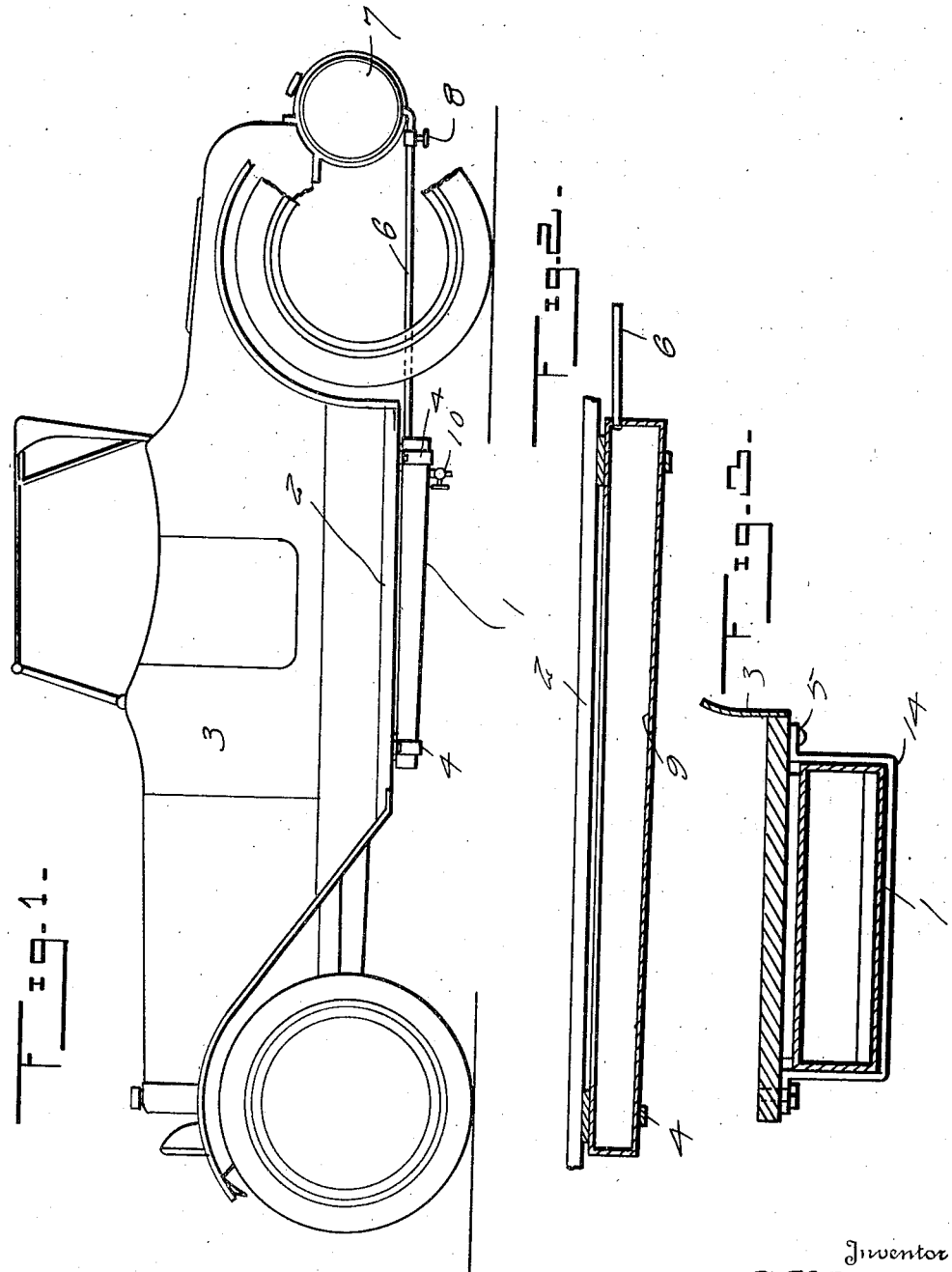

SAMUEL H. LOVE, OF SANFORD, FLORIDA, ASSIGNOR OF ONE-THIRD TO HENRY MEACHAM, OF SANFORD, FLORIDA.

EMERGENCY-TANK FOR AUTOMOBILES.

1,351,336. Specification of Letters Patent. Patented Aug. 31, 1920.

Application filed September 5, 1917, Serial No. 189,777. Renewed January 14, 1920. Serial No. 351,495.

*To all whom it may concern:*

Be it known that I, SAMUEL H. LOVE, a citizen of the United States, residing at Sanford, in the county of Seminole and State of Florida, have invented certain new and useful Improvements in Emergency-Tanks for Automobiles; and I do hereby declare the following to be a full, clear, and exact description of the invention, such as will enable others skilled in the art to which it appertains to make and use the same.

The invention relates to an emergency tank for automobiles.

The object of the present invention is to provide a simple, practical and efficient emergency tank for automobiles of strong, durable and inexpensive construction designed to be located beneath the running board and to be connected with the main fuel tank or a water tank and adapted to be automatically filled when the main tank is filled so that an emergency supply may be had for running the machine in event of the main tank being accidentally emptied.

It is also an object of the invention to provide an emergency tank of this character from which the oil, gasolene or other fuel, or water will not run into the main tank and which may also be cut off from the main tank so that when the emergency supply is emptied into the main tank it will not return to the emergency tank.

With these and other objects in view, the invention consists in the construction and novel combination of parts hereinafter fully described, illustrated in the accompanying drawing and pointed out in the claim hereto appended; it being understood that various changes in the form, proportion, size and minor details of construction, within the scope of the claim, may be resorted to without departing from the spirit or sacrificing any of the advantages of the invention.

In the drawing:

Figure 1 is a side elevation of an automobile provided with an emergency tank constructed in accordance with this invention.

Fig. 2 is a longitudinal sectional view of the emergency tank.

Fig. 3 is a transverse sectional view of the same.

Like numerals of reference designate corresponding parts in the several figures of the drawing.

In the accompanying drawing, in which is illustrated the preferred embodiment of the invention, 1 designates an emergency tank located beneath the running board 2 at one side of an automobile 3 and secured to the running board by means of metallic straps or hangers 4 located at the terminal portions of the tank. The straps or hangers conform to the configuration of the tank and their terminal portions 5 are angularly bent to fit against the lower face of the running board and are suitably secured thereto by screws or other fastening devices. The tank is preferably rectangular in both cross section and longitudinal section and is designed to be of sufficient size to hold a gallon of fuel or water. In the drawing, the rear end of the tank is connected by a pipe 6 with the main fuel tank 7 of the automobile, a suitable valve 8 being located in the pipe for cutting off the emergency tank when the contents thereof have been emptied into the main fuel tank for emergency use. The fuel tank 1 is also provided with an inclined bottom 9 and the said tank is provided at a point adjacent to the lower end of the bottom with a discharge cock or valve 10 so that the contents of the emergency tank may be emptied into a receptacle and transferred from the emergency tank to the main tank should the latter be accidentally emptied. This will afford a sufficient amount of fuel to enable a machine to reach a point where the main tank can be refilled. After the contents of the auxiliary tank are drawn off, the valve 8 is closed and the fuel is poured into the main tank and will be prevented by the valve from returning to the emergency tank. Each of the running boards may be equipped with the tank shown and one of the tanks may be used for holding a supply of water for cooling the engine.

What is claimed is:

The combination with an automobile including a running board, of a main fuel supply tank carried thereby, an auxiliary tank suspended from the under face of said running board and positioned closely adjacent the same, the auxiliary tank corresponding substantially in length and width to the running board and the running board acting to support and to cover said auxiliary tank so as to protect the same from injury while permitting ready access to the auxiliary tank, said auxiliary tank being positioned below the main tank, a pipe establishing communication between the main tank and the auxiliary tank at the top thereof, a control valve in said pipe, and means for draining fuel from said auxiliary tank.

In testimony whereof I affix my signature in presence of two witnesses.

SAMUEL H. LOVE.

Witnesses:
M. I. LEWIS,
BENNETT S. JONES.